US011932202B2

(12) United States Patent
Sakurada et al.

(10) Patent No.: US 11,932,202 B2
(45) Date of Patent: Mar. 19, 2024

(54) VEHICLE CONTROL SYSTEM, VEHICLE CONTROL DEVICE, AND COMPUTER READABLE RECORDING MEDIUM

(71) Applicants: TOYOTA JIDOSHA KABUSHIKI KAISHA, Toyota (JP); CMC CORPORATION, Nagoya (JP)

(72) Inventors: Shin Sakurada, Toyota (JP); Yasuhisa Ohta, Toyota (JP); Naoyuki Takada, Toyota (JP); Satoru Sakuma, Nagakute (JP); Yuki Tatsumoto, Nagoya (JP); Tetsu Yajima, Nagoya (JP)

(73) Assignees: TOYOTA JIDOSHA KABUSHIKI KAISHA, Toyota (JP); CMC CORPORATION, Nagoya (JP)

( * ) Notice: Subject to any disclaimer, the term of this patent is extended or adjusted under 35 U.S.C. 154(b) by 622 days.

(21) Appl. No.: 17/142,779

(22) Filed: Jan. 6, 2021

(65) Prior Publication Data

US 2021/0237690 A1     Aug. 5, 2021

(30) Foreign Application Priority Data

Jan. 30, 2020  (JP) ................................ 2020-013934

(51) Int. Cl.
*B60R 25/04* (2013.01)
*B60R 25/102* (2013.01)
(Continued)

(52) U.S. Cl.
CPC ............. *B60R 25/31* (2013.01); *B60R 25/04* (2013.01); *B60R 25/102* (2013.01); *B60R 25/24* (2013.01); *B60R 25/25* (2013.01); *B60R 2325/10* (2013.01)

(58) Field of Classification Search
CPC .......... B60R 25/04; B60R 25/31; B60R 25/24
See application file for complete search history.

(56) References Cited

U.S. PATENT DOCUMENTS

| 7,401,229 B2* | 7/2008 | Ishidoshiro ......... H04L 63/0428 713/192 |
| 2005/0086493 A1* | 4/2005 | Ishidoshiro ......... H04L 63/0428 370/310 |

(Continued)

FOREIGN PATENT DOCUMENTS

| JP | 2005-273281 A | 10/2005 |
| JP | 2009-102943 A | 5/2009 |

(Continued)

*Primary Examiner* — Long T Tran
(74) *Attorney, Agent, or Firm* — Sughrue Mion, PLLC (57) ABSTRACT

A vehicle control system includes: an entry/exit management device including a first processor including hardware, the first processor being configured to detect that a user of a vehicle enters or leaves a facility, and output a first signal indicating user's entering the facility and a second signal indicating user's leaving the facility, to a server; and the server comprising a second processor comprising hardware, the second processor being configured to output to the vehicle a third signal for deactivating a smart key function of the vehicle when acquiring the first signal and prohibit unlocking of a door of the vehicle performed by wireless communication, and output to the vehicle a fourth signal for setting the smart key function of the vehicle when acquiring the second signal and permit unlocking of the door of the vehicle performed by wireless communication.

20 Claims, 4 Drawing Sheets

(51) Int. Cl.
    *B60R 25/24*     (2013.01)
    *B60R 25/25*     (2013.01)
    *B60R 25/31*     (2013.01)

(56) References Cited

U.S. PATENT DOCUMENTS

| | | | |
|---|---|---|---|
| 2005/0128076 A1* | 6/2005 | Shinada | G08B 13/1427 340/5.1 |
| 2006/0143463 A1* | 6/2006 | Ikeda | G07C 9/00817 713/182 |
| 2009/0101709 A1* | 4/2009 | Nonaka | G07C 9/28 235/382 |
| 2009/0256677 A1* | 10/2009 | Hein | B60R 25/00 340/5.72 |
| 2013/0091907 A1* | 4/2013 | Nishijima | B60L 53/14 70/237 |
| 2014/0139331 A1* | 5/2014 | Oliver | B60R 25/04 340/426.19 |
| 2017/0136990 A1 | 5/2017 | Tercero | |
| 2018/0056937 A1* | 3/2018 | Pflug | B60R 25/24 |
| 2018/0178758 A1* | 6/2018 | Yamaguchi | G07C 9/00309 |
| 2019/0012859 A1* | 1/2019 | Leonhardt | B60R 25/10 |
| 2020/0189520 A1* | 6/2020 | Chung | G07C 9/00944 |
| 2020/0351665 A1* | 11/2020 | Kelly | B60R 25/245 |

FOREIGN PATENT DOCUMENTS

| | | |
|---|---|---|
| JP | 2010-144366 A | 7/2010 |
| JP | 2015-218457 A | 12/2015 |

* cited by examiner

VEHICLE CONTROL SYSTEM, VEHICLE CONTROL DEVICE, AND COMPUTER READABLE RECORDING MEDIUM

The present application claims priority to and incorporates by reference the entire contents of Japanese Patent Application No. 2020-013934 filed in Japan on Jan. 30, 2020.

BACKGROUND

The present disclosure relates to a vehicle control system, a vehicle control device, and a computer readable recording medium.

JP 2015-218457 A discloses a smart key system that performs wireless communication between a vehicle and a smart key to unlock a door of the vehicle. In this system, when the position of a position information terminal, such as a smartphone, is within an unlock permission range, unlocking the door by the smart kay is permitted (smart key function is turned on).

SUMMARY

There is a need for a vehicle control system, a vehicle control device, and a computer readable recording medium that are configured to turn on or off a smart key function without using user location information.

According to one aspect of the present disclosure, there is provided a vehicle control system including: an entry/exit management device including a first processor including hardware, the first processor being configured to detect that a user of a vehicle enters or leaves a facility, and output a first signal indicating user's entering the facility and a second signal indicating user's leaving the facility, to a server; and the server comprising a second processor comprising hardware, the second processor being configured to output to the vehicle a third signal for deactivating a smart key function of the vehicle when acquiring the first signal and prohibit unlocking of a door of the vehicle performed by wireless communication, and output to the vehicle a fourth signal for setting the smart key function of the vehicle when acquiring the second signal and permit unlocking of the door of the vehicle performed by wireless communication.

DETAILED DESCRIPTION

A vehicle control system, a vehicle control device, and a computer readable recording medium according to an embodiment will be described with reference to the drawings. Furthermore, the component elements in the following embodiments include component elements that may be readily substituted by a person skilled in the art of component elements that are substantially equivalent.

The configurations of the vehicle control system and the vehicle control device according to the embodiment will be described with reference to FIGS. 1 and 2. The vehicle control system, the vehicle control device, and the vehicle control program according to the embodiment are used to control a smart key function and an immobilizer function that are mounted on a vehicle, in response to the user's entering or leaving a facility.

Here, the "user" refers to an occupant of the vehicle, including a driver, and a user (resident) of the facility. Furthermore, examples of the "facility" include a company, home, or the like. In the embodiment, it is assumed that a parking place (parking lot) for the vehicle of the user is provided inside or outside this facility.

The "smart key function" represents a function of unlocking and locking a door of the vehicle by wireless communication (short-range wireless communication) between a key device (electronic key) carried by the user and the vehicle. The smart key function includes a smart entry function in which when the user who has the key device approaches the vehicle, the vehicle authenticates the key device through wireless communication to unlock a door or the like in response to touching a doorknob or the like of the vehicle by the user, and a remote keyless entry function in which the user's operation of a switch of the key device to unlock a door or the like.

In the embodiment, turning on the smart key function to permit unlocking of a door of the vehicle performed by wireless communication is referred to as "set (return to) the smart key function", and turning off the smart key function to prohibit unlocking of the door of the vehicle performed by wireless communication is referred to as "deactivate (cancel) the smart key function".

The "immobilizer function" is specifically a remote immobilizer function and represents a function of prohibiting an engine of the vehicle of the user from starting by remote operation from the server device. In the embodiment, turning on the immobilizer function to prohibit the engine of the vehicle from starting is expressed as "set the immobilizer function", and turning off the immobilizer function to permit the engine of the vehicle to start is referred to as "deactivate (cancel) the immobilizes function".

Figure 1:
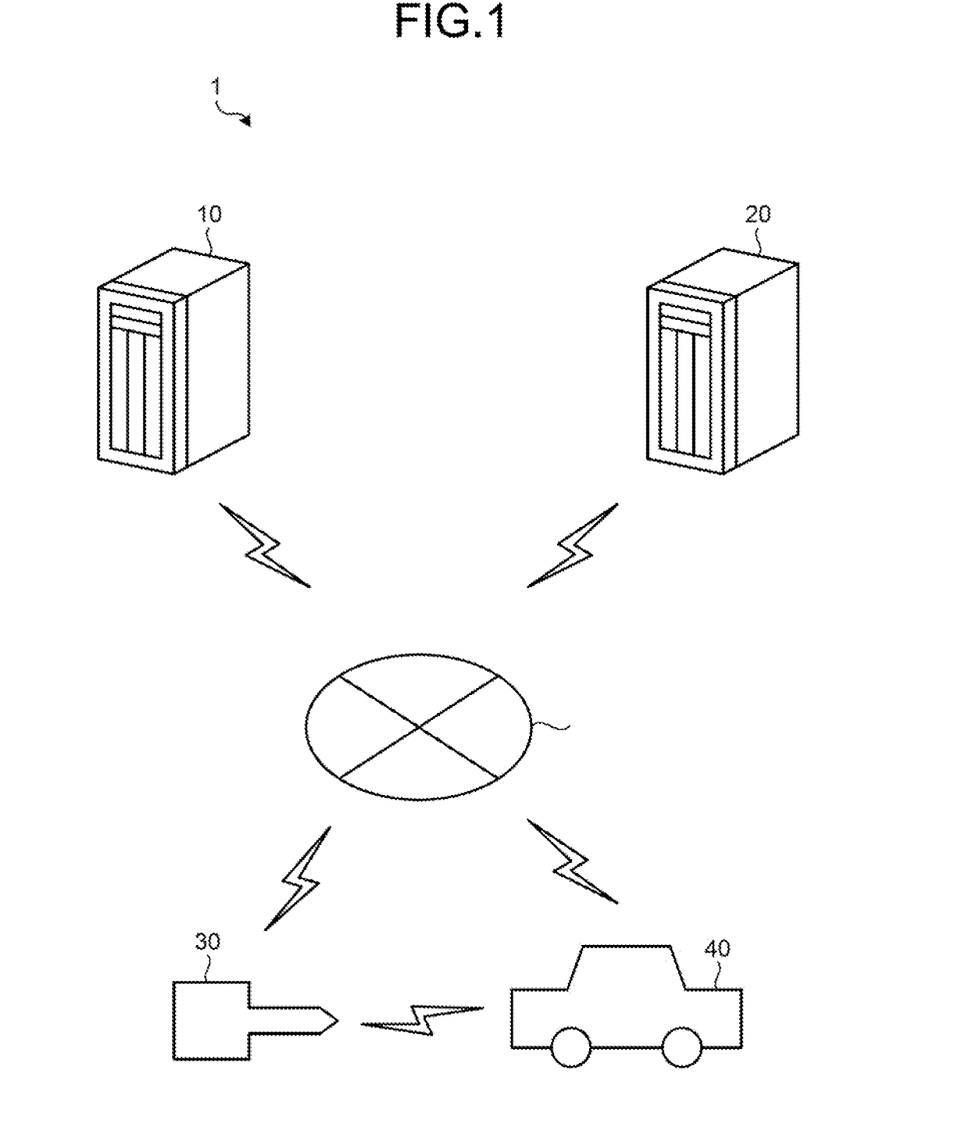
FIG. 1 is a diagram schematically illustrating a vehicle control system and a vehicle control device according to an embodiment.

As illustrated in FIG. 1, a vehicle control system 1 includes a server device 10, an entry/exit management device 20, a key device 30, and a vehicle 40. The vehicle control device according to the embodiment is specifically achieved by the server device 10. The server device 10, the entry/exit management device 20, the key device 30, and the vehicle 40 are configured to be communicable with each other through a network NW. The network NW includes, for example, an internet network, a mobile phone network, and the like.

Figure 2:
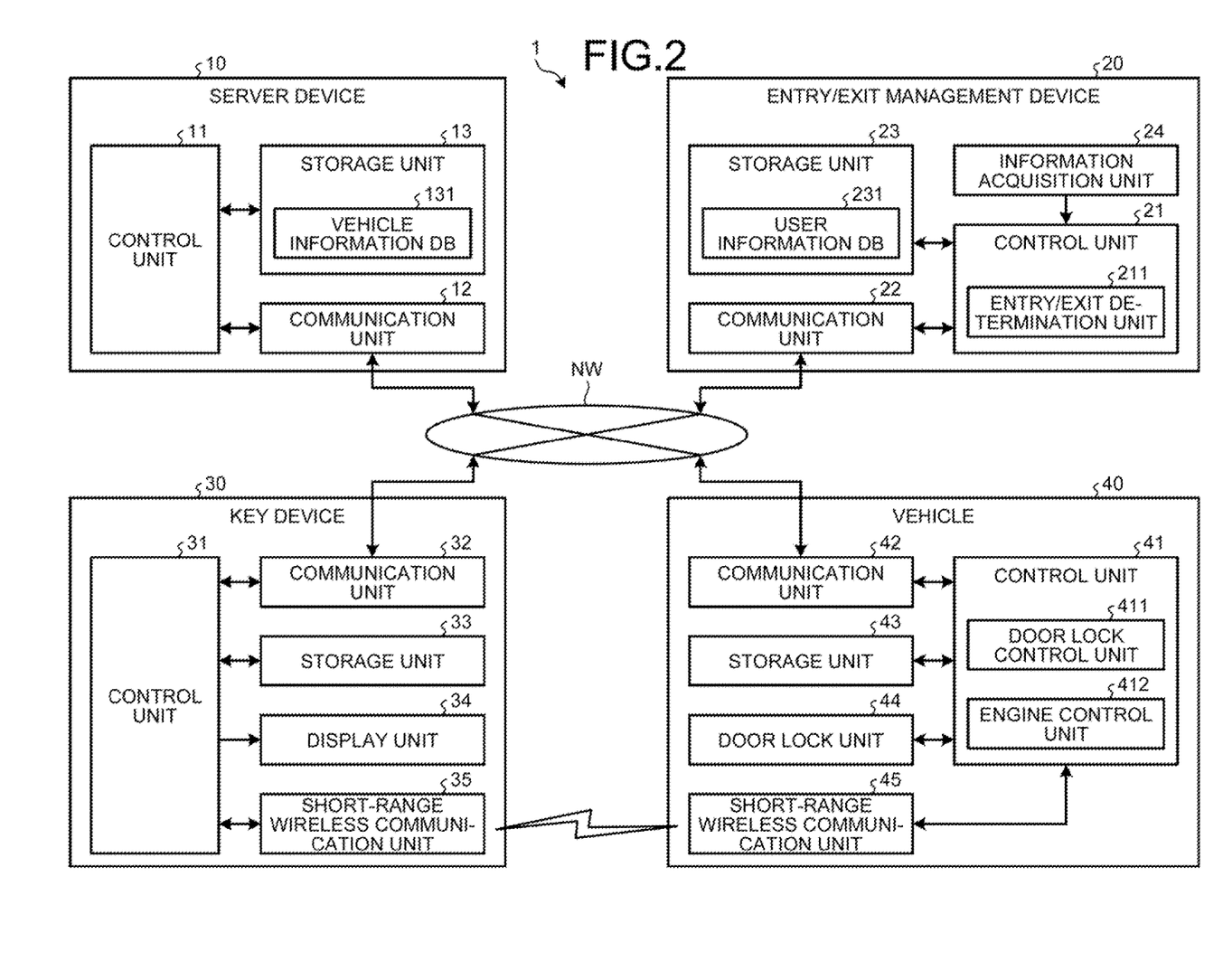
FIG. 2 is a block diagram schematically illustrating a configuration of a vehicle control system and a vehicle control device according to the embodiment.

As illustrated in FIG. 2, the server device 10 includes a control unit 11, a communication unit 12, and a storage unit 13. The control unit 11 specifically includes a processor such as a central processing unit (CPU), a digital signal processor (DSP), or a field-programmable gate array (FPGA), and a memory (main storage unit) such as a random access memory (RAM), a read only memory (ROM), and the like.

The control unit 11 loads a program stored in the storage unit 13 into a work area of the main storage unit, executes the program, and controls each component unit through execution of the program, thus, achieving a function satisfying a predetermined purpose.

The control unit 11 acquires a signal (hereinafter referred to as "entry detection signal") that indicates that the user enters the facility, and a signal (hereinafter referred to as "exit detection signal") indicating that the user leaves the facility, from the entry/exit management device 20 provided in the facility.

When acquiring the entry detection signal from the entry/exit management device 20, the control unit 11 outputs to the vehicle 40 a signal (hereinafter referred to as "smart key deactivation request signal") for deactivating the smart key function of the vehicle 40. This configuration turns off the smart key function, and unlocking a door of the vehicle 40 performed by wireless communication is prohibited. On the other hand, when acquiring the exit detection signal from the entry/exit management device 20, the control unit 11 outputs to the vehicle 40 a signal (hereinafter referred to as "smart key setting request signal") for setting the smart key function of the vehicle 40. This configuration turns on the smart key function, and unlocking of the door of the vehicle 40 performed by wireless communication is permitted.

Note that the control unit 11 collates information about the user included in the entry detection signal with information about the user stored in a vehicle information DB 131 of the storage unit 13 and identifies a vehicle 40 of the user, thereby outputting the smart key deactivation request signal and the smart key setting request signal to the identified vehicle 40.

The control unit 11 may output a signal (hereinafter, referred to as "immobilizer setting request signal") for setting the immobilizer function of the vehicle 40, in addition to the smart key deactivation request signal, to the vehicle 40, when acquiring the entry detection signal from the entry/exit management device 20. Thus, the immobilizer function is turned on and the engine of the vehicle 40 is prohibited from starting. On the other hand, when acquiring the exit detection signal from the entry/exit management device 20, the control unit 11 outputs a signal (hereinafter, referred to as "immobilizer deactivation request signal") for deactivating the immobilizer function of the vehicle 40, in addition to the smart key setting request, to the vehicle 40. Thus, the immobilizer function is turned off, and the engine of the vehicle 40 is permitted to start.

Note that the control unit 11 collates information about the user included in the entry detection signal with information about the user stored in the vehicle information DB 131 of the storage unit 13 and identifies a vehicle 40 of the user, thereby outputting the immobilizer setting request signal and the immobilizer deactivation request signal to the identified vehicle 40.

The control unit 11 may output the smart key setting request signal to the vehicle 40 after a predetermined time, when acquiring the exit detection signal from the entry/exit management device 20. Note that the "predetermined time" may be calculated, for example, based on a distance from the facility where the user is located to the parking place of the vehicle 40 and an average walking speed of the user. Moreover, for this predetermined time, an average movement time for the user to move from the facility to the parking plate may be set. As described above, instead of setting the smart key function immediately after the user leaves the facility, setting the smart key function is delayed by a predetermined time in consideration of a time from when the user leaves the facility to when the user reaches the parking place, and thereby it is possible to prevent, for example, stealing of the vehicle 40 that is caused by unlocking the door of the vehicle 40 by, for example, a relay attack, while the user moves from the facility to the parking place.

Here, the "relay attack" represents a theft of the vehicle 40 by illegally using the smart key function by a malicious third party, and in the relay attack, for example, a relay device that relays a wireless communication signal is located between the key device 30 and the vehicle 40 to unlock the door of the vehicle 40 even if the key device 30 is located far from the vehicle 40.

The control unit 11 may output the immobilizer deactivation request signal to the vehicle 40 after a predetermined time that is set according to the distance from the facility where the user is located to the parking place of the vehicle 40, where acquiring the exit detection signal from the entry/exit management device 20. As described above, instead of deactivating the immobilizer function immediately after the user leaves the facility, deactivating the immobilizer function is delayed by a predetermined time in consideration of a time from when the user leaves the facility to when the user reaches the parking place, and thereby it possible to prevent, for example, stealing of the vehicle 40 that is caused by starting the engine of the vehicle 40 by, for example, a relay attack, while the user moves from the facility to the parking place.

The control unit 11 may output a signal indicating a setting status of the smart key function to the key device 30 carried by the user to display the setting status of the smart key function on a display unit 34 of the device 30, when outputting the smart key deactivation request signal and the smart key setting request signal to the vehicle 40. Thus, the user may confirm the setting status of the smart key function at any time, and thereby the convenience may be improved.

The control unit 11 may output a signal indicating the setting status of the immobilizer function to the key device 30 carried by the user to display the setting status of the immobilizer function on the display unit 34 of the key device 30, when outputting the immobilizer setting request signal and the immobilizer deactivation request signal to the vehicle 40. Thus, the user may confirm the setting status of the immobilizer function at any time, and thereby the convenience may be improved.

The communication unit 12 includes, for example, a local area network (LAN) interface board, a wireless communication circuit for wireless communication, and the like. The communication unit 12 is connected to the network NW such as the Internet being a public communication network. Then, the communication unit 12 is connected to the network NW to communicate with the entry/exit management device 20 and the vehicle 40.

The storage unit 13 includes a recording medium such as an erasable programmable ROM (EPROM), hard disk drive (HDD), removable medium, or the like. Note that an example of the removable medium includes, for example, a universal serial bus (USB) memory or a disc recording medium such as a compact disc (CD), digital versatile disc (DVD), or a Blu-ray (BD) (registered trademark) disc. Furthermore, the storage unit 13 is configured to store an operating system (OS), various programs, various tables, various databases, and the like.

The storage unit 13 includes the vehicle information DB 131. This database (DB) includes data stored in the storage unit 13, and the data is managed by a program of a database management system (DBMS) executed by the control unit 11.

The vehicle information DB 131 includes a relational database in which vehicle information that is information about the vehicle 40 used by the user is stored in a searchable manner. Examples of the vehicle information include information (name, ID, etc.) about the user who uses the vehicle 40, the number, the vehicle type, and the like of the vehicle 40.

The entry/exit management device 20 is provided in a facility (company, home) used by the user. The entry/exit management device 20 includes a control unit 21, a communication unit 22, a storage unit 23, and an information acquisition unit 24. The control unit 21, communication unit 22, and storage unit 23 are physically configured similarly to the control unit 11, the communication unit 12, and the storage unit 13.

The control unit 21 functions as an entry/exit determination unit 211 through the execution of a program stored in the storage unit 23. The entry/exit determination unit 211 determines whether the user enters the facility and whether the user leaves the facility, based on information acquired the information acquisition unit 24.

A determination method in the entry/exit determination unit 211 differs depending on individual authentication method in entering or leaving the facility. Examples of the individual authentication method include, for example, biometric authentication, authentication using an IC card, or authentication using a personal identification number.

For example, in the biometric authentication performed in entering or leaving the facility, the entry/exit determination unit 211 collates, for authentication, biometric information (e.g., fingerprint information, voiceprint information, iris information, face information) about the user input from the information acquisition unit 24 with biometric information about the user stored in a user information DB 231 of the storage unit 23, identifies the user, and detects the user's entering or leaving the facility.

Furthermore, in the authentication using an IC card performed in entering or leaving the facility, the entry/exit determination unit 211 collates, for authentication, IC card information input from the information acquisition unit 24 with IC card information about the user stored in the user information DB 231, identifies the user, and detects the user's entering or leaving the facility.

Further, when the authentication using a personal identification number is performed in entering or leaving the facility, the entry/exit determination unit 211 collates, for authentication, a personal identification number input from the information acquisition unit 24 with a personal identification number of the user stored in the user information DB 231, identifies the user, and detects the user's entering or leaving the facility.

The entry/exit determination unit 211 detecting user's entering the facility outputs the entry detection signal to the server device 10. Furthermore, the entry/exit determination unit 211 detecting the user's leaving the facility outputs the exit detection signal to the server device 10. Note that the entry/exit determination unit 211 outputs information about the user who has entered or left the facility to the server device 10, together with the entry detection signal and the exit detection signal.

The storage unit 23 includes the user information DB 231. This database includes data stored in the storage unit 23, and the data is managed by a program of a database management system executed by the control unit 21.

The user information DB 231 includes a relational database in which the user information that is information about the user who uses the facility is stored in a searchable manner. The user information differs depending on individual authentication method in entering or leaving the facility.

For example, in biometric authentication performed in entering or leaving a facility, an example of the user information includes biometric information such as fingerprint information (fingerprint authentication), voiceprint information (voice authentication), iris information (iris authentication), or face information (face authentication). Furthermore, in authentication using an IC card performed in entering or leaving the facility, an example user information includes IC card information such as the name, ID, affiliation, or employee number of the user. Furthermore, in authentication using a personal identification number performed in entering or leaving the facility, an example of the user information includes information such as the name, personal identification number, affiliation, or employee number of the user.

The information acquisition unit 24 acquires information about the user who enters or leaves the facility. The specific configuration of the information acquisition unit 24 differs depending on individual authentication method in entering or leaving the facility.

For example, in biometric authentication performed in entering or leaving a facility, the information acquisition unit 24 is, for example, a fingerprint reader (fingerprint authentication), microphone (voiceprint authentication), or camera (iris authentication, face authentication) that acquires biometric information about the user who enters or leaves the facility. Furthermore, in authentication using an IC card performed in entering or leaving the facility, the information acquisition unit 24 is, for example, an IC card reader that acquires data in an IC card of the user who enters or leaves the facility. Furthermore, in authentication using a personal identification number performed in entering or leaving the facility, the information acquisition 24 is, for example, a touch panel or a numeric keypad that acquires a personal identification number input by the user who enters or leaves the facility.

The key device 30 is carried by the user of the vehicle 40. The key device 30 includes a control unit 31, a communication unit 32, a storage unit 33, the display unit 34, and a short-range wireless communication unit 35. The control unit 31, communication unit 32, and storage unit 33 are physically configured similarly to the control unit 11, the communication unit 12, and the storage unit 13.

The storage unit 33 stores a key ID unique to the vehicle 40 that uses the smart key function. The display unit 34 is specifically an indicator. The display unit 34 presents the setting status of the smart key function and the setting status of the immobilizer function to the user such as by lighting or blinking based on a signal input from the server device 10. Thus, the user may confirm the setting status of the smart key function and the setting status of the immobilizer function at any time.

The short-range wireless communication unit 35 has a communication function according to a standard such as near field radio communication (NFC), Bluetooth (registered trademark) low energy (BLE), or Infrared Data Association (IrDA). In the embodiment, in using the smart key function, short-range wireless communication is performed with the vehicle 40 through the short-range wireless communication unit 35.

The vehicle 40 includes a control unit 41, a communication unit 42, a storage unit 43, a door lock unit 44, and a short-range wireless communication unit 45. The storage unit 43 and the short-range wireless communication unit 45 are physically configured similarly to the storage unit 13 and the short-range wireless communication unit 35. The control unit 41 is an electronic control unit (ECU) that integrally controls the operations of various component elements mounted on the vehicle 40.

The control unit 41 functions as a door lock control unit 411 and an engine control unit 412 through execution of the programs stored in the storage unit 43. The door lock control unit 411 collates a key ID stored in the storage unit 43 with key ID stored in the storage unit 33 of the key device 30 by wireless communication and locks or unlocks a door of the vehicle 40.

When the smart key deactivation request signal is input from the server device 10, the door lock control unit 411 turns off the smart key function and prohibits the key device 30 from unlocking the door of the vehicle 40. On the other hand, when the smart key setting request signal is input from the server device 10, the door lock control unit 411 turns on the smart key function and permits the key device 30 to unlock the door of the vehicle 40.

The engine control unit 412 controls starting of the engine of the vehicle 40. When the immobilizer setting request signal is from the server device 10, the engine control unit 412 turns on the immobilizer function and prohibits the engine of the vehicle 40 from starting. On the other hand, when the immobilizer deactivation request signal is input from the server device 10, the engine control unit 412 turns off the immobilizer function and permits the engine of the vehicle 40 to start.

The communication unit 42 includes, for example, a data communication module (DCM) or the like and communicates with the server device 10 by wireless communication via the network NW. The storage unit 43 stores the key ID unique to the vehicle 40 that uses the smart key function. The door lock unit 44 is, for example, an electric door lock device provided at a door of the vehicle 40. The door lock unit 44 locks or unlocks the door of the vehicle 40 under the control of the control unit 41.

Figure 3:
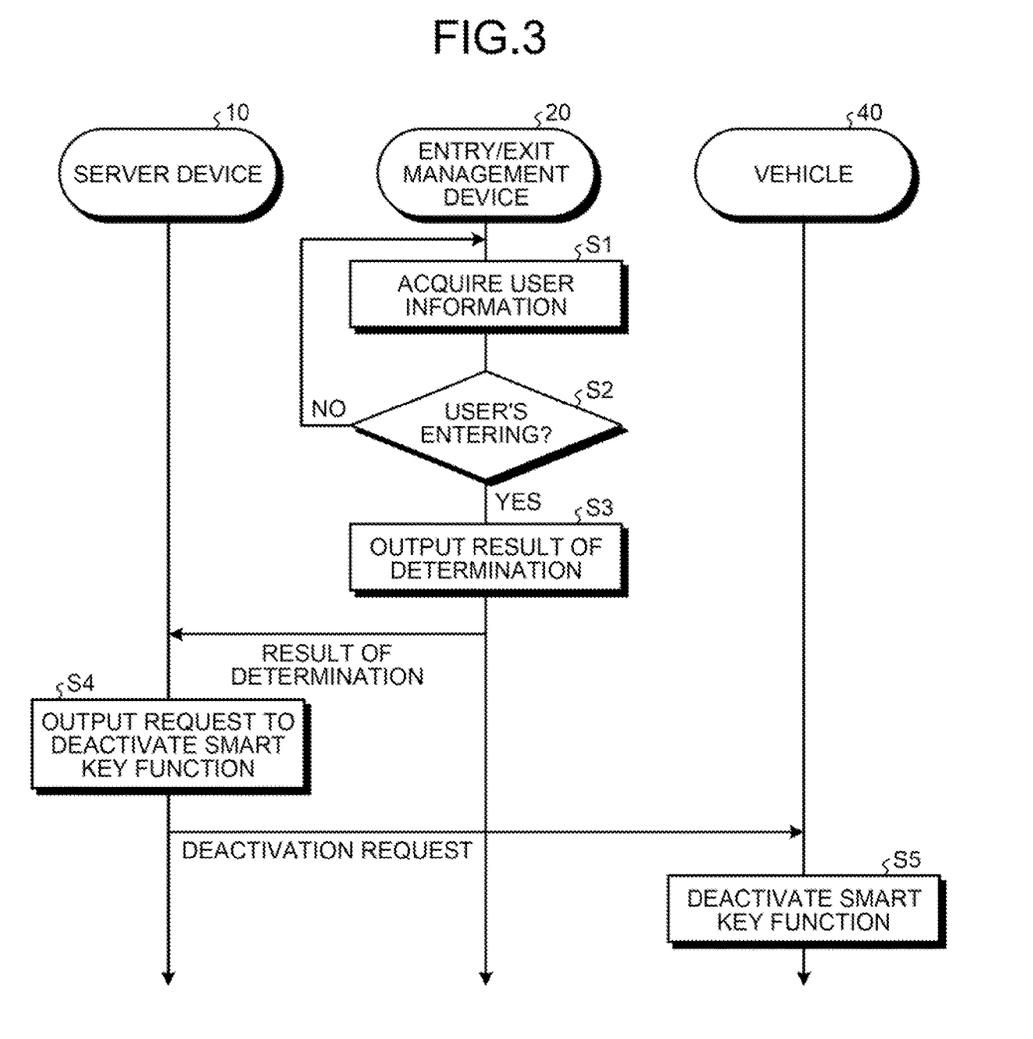
FIG. 3 is a flowchart illustrating a processing procedure of a vehicle control method performed by a vehicle control system, a vehicle control device, and a vehicle control program according to the embodiment.

In the vehicle control method performed by the vehicle control system 1 and the vehicle control device according to the embodiment, a process performed when the user enters the facility will be described with reference to FIG. 3.

First, the information acquisition unit 24 of the entry/exit management device 20 acquires information (e.g., fingerprint information, voiceprint information, iris information, face information, IC card information, personal identification number) about the user who enters the facility (Step S1). Subsequently, the entry/exit determination unit 211 of the entry/exit management device 20 determines whether the user has entered the facility based on the information about the user (Step S2).

If it is determined that the user has entered the facility (Yes in Step. S2), the entry/exit determination unit 211 outputs a result of the determination (entry detection signal) to the server device 10 (Step S3). On the other hand, if it is determined that the user has not entered the facility (No in Step S2), the entry/exit determination unit 211 returns to Step S1.

Subsequently, the control unit 11 of the server device 10 outputs a request to deactivate the smart key function (smart key deactivation request signal) to the vehicle 40 (Step 54). Subsequently, the vehicle 40 deactivates the smart key function (Step S5) and finishes this process.

Note that in Step S4, the control unit 11 may output to the vehicle 40 a request to set the immobilizer function (immobilizer setting request signal) in addition to the request to deactivate the smart key function (smart key deactivation request signal). In response to this, the vehicle 40 deactivates the smart key function and sets the immobilizer function.

Figure 4:
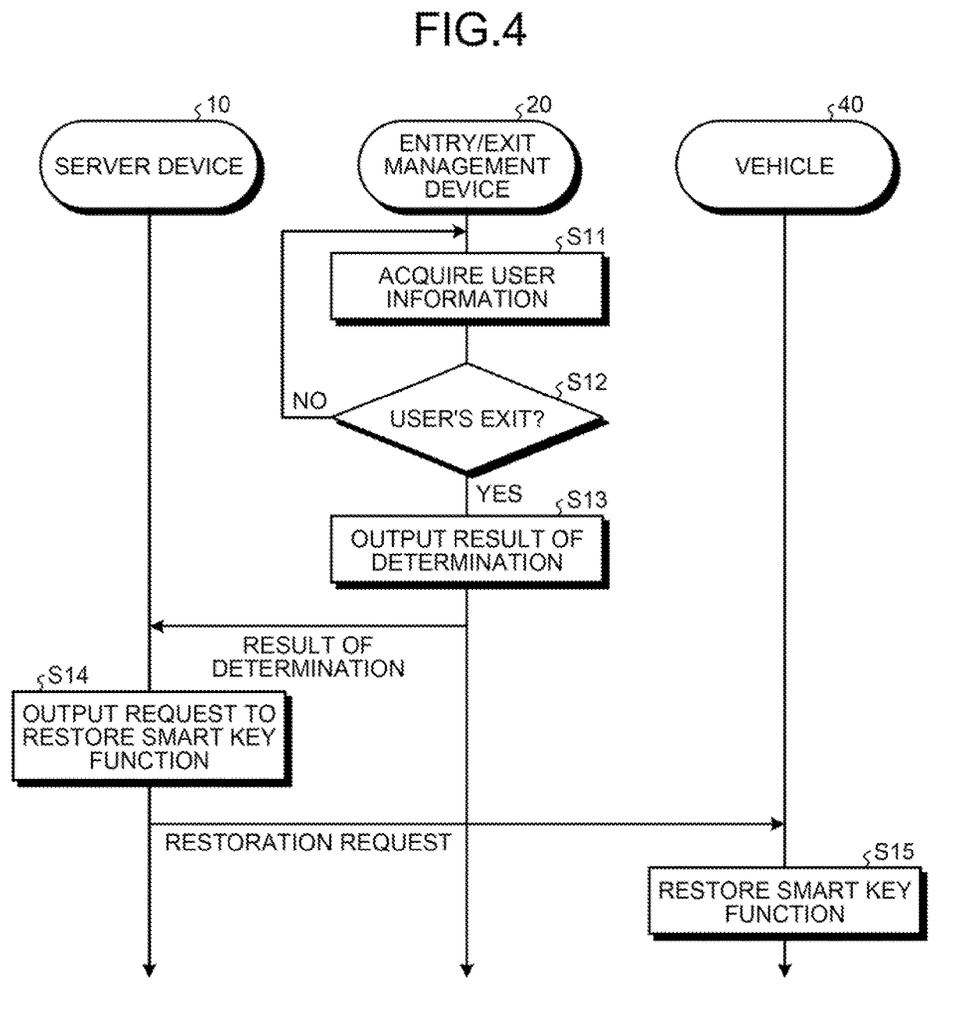
FIG. 4 is a flowchart illustrating a processing procedure of a vehicle control method performed by a vehicle control system, a vehicle control device, and a vehicle control program according to the embodiment.

In the vehicle control method performed by the vehicle control system 1 and the vehicle control device according to the embodiment, a process performed when the user leaves the facility will be described with reference to FIG. 4.

First, the information acquisition unit 24 of the entry/exit management device 20 acquires information (e.g., fingerprint information, voiceprint information, iris information, face information, IC card information, personal identification number) about the user who leaves the facility (Step S11). Subsequently, the entry/exit determination unit 211 of the entry/exit management device 20 determines whether the user has left the facility based on the information about the user (Step S12).

If it is determined that the user has left the facility (Yes in Step S12), the entry/exit determination unit 211 outputs a result of the determination (exit detection signal) to the server device 10 (Step S13). On the other hand, if it is determined that the user has not left the facility (No in Step S12), the entry/exit determination unit 211 returns to Step S11.

Subsequently, the control unit 11 of the server device 10 outputs a request to restore the smart key function (smart key setting request signal) to the vehicle 40 (Step S14). Subsequently, the vehicle 40 restores the smart key function (Step S15) and finishes this process.

Note that in Step S14, the control unit 11 may output to the vehicle 40 a request to deactivate the immobilizer function (immobilizer deactivation request signal) in addition to the request to restore the smart key function (smart key setting request signal). In response to this, the vehicle 40 sets the smart key function and deactivates the immobilizer function.

The vehicle control system 1, the vehicle control device, and the vehicle control program according to the embodiment described above are configured to turn on or off the smart key function and the immobilizer function without using the user location information.

Furthermore, the vehicle control system 1, the vehicle control device, and the vehicle control program according to the embodiment are configured to turn off the smart key function and turn on the immobilizer function when the user is in the facility, thereby preventing, for example, unlocking a door of the vehicle 40 due to a relay attack by a malicious third party regardless of the user's intention.

Note that, the vehicle control system 1, the vehicle control device, and the vehicle control program according to the embodiment are configured to determine entering or leaving the facility by acquiring, as the user information, information unique to the user in entering or leaving the facility. Therefore, even if there is a plurality of users who enters and leaves the facility and there is a plurality of vehicles 40, it is possible to detect that each user enters or leaves the facility and turn on or off the smart key function and immobilizer function of each vehicle 40 of each user.

On the other hand, when there is only one user who uses the facility, it is not necessary to determine who the user is in entering or leaving the facility. Therefore, in this case, a method other than the biometric authentication may be used to detect the user's entering or leaving. For example, the information acquisition unit 24 may constantly monitor opening/closing of an entrance door of the facility and the entry/exit determination unit 211 may detect the user's entering or leaving the facility based on the opening/closing of the door. In this way, detecting the user's entering or leaving based on the opening/closing of the door makes it possible to detect the user's entering or leaving more simply and inexpensively.

According to the present disclosure, it is possible to permit or prohibit unlocking a door by a smart key without using user location information.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed:

1. A vehicle control system comprising:
   an entry/exit management device comprising a first processor comprising hardware, the first processor being configured to
     detect that a user of a vehicle enters or leaves a facility, and
     output a first signal indicating user's entering the facility and a second signal indicating user's leaving the facility, to a server; and
   the server comprising a second processor comprising hardware, the second processor being configured to
     output to the vehicle a third signal for deactivating a smart key function of the vehicle when acquiring the first signal and prohibit unlocking of a door of the vehicle performed by wireless communication, and
     output to the vehicle a fourth signal for setting the smart key function of the vehicle when acquiring the second signal and permit unlocking of the door of the vehicle performed by wireless communication,
   wherein the second processor is configured to, when acquiring the second signal, output the fourth signal to the vehicle, after a predetermined time that is set according to a distance from the facility to a parking place of the vehicle.

2. The vehicle control system according to claim 1, wherein the second processor is configured to:
   when acquiring the first signal, output to the vehicle a fifth signal for setting an immobilizer function of the vehicle, in addition to the third signal and prohibit an engine of the vehicle from starting; and
   when acquiring the second signal, output to the vehicle a sixth signal for deactivating the immobilizer function of the vehicle, in addition to the fourth signal and permit the engine of the vehicle to start.

3. The vehicle control system according to claim 2, wherein the second processor is configured to, when acquiring the second signal, output the sixth signal to the vehicle, after the predetermined time.

4. The vehicle control system according to claim 2, wherein the second processor is configured to, when outputting the fifth signal and the sixth signal to the vehicle, output a signal indicating a setting status of the immobilizer function to a key device of the user to display the setting status of the immobilizer function on a display unit of the key device.

5. The vehicle control system according to claim 1, wherein the first processor is configured to;
   acquire biometric information about the user who enters or leaves the facility; and
   perform authentication to detect the user's entering or leaving the facility.

6. The vehicle control system according to claim 1, wherein the first processor is configured to:
   acquire data in an IC card of the user who enters or leaves the facility; and
   perform authentication to detect the user's entering or leaving the facility.

7. The vehicle control system according to claim 1, wherein the first processor is configured to detect the user's entering or leaving the facility based on opening/closing of an entrance door of the facility.

8. The vehicle control system according to claim 1, wherein the second processor is configured to, when outputting the third signal and the fourth signal to the vehicle, output a signal indicating a setting status of the smart key function to a key device of the user to display the setting status of the smart key function on a display unit of the key device.

9. The vehicle control system according to claim 1, wherein the predetermined time is set based on an average movement time for the user to move the distance from the facility to a parking place of the vehicle.

10. A vehicle control device comprising
    a processor comprising hardware, the processor being configured to:
      when acquiring, from an entry/exit management device that detects that a user of a vehicle enters or leaves a facility, a first signal indicating the user's entering the facility, output to the vehicle a third signal for deactivating a smart key function of the vehicle and prohibit unlocking of a door of the vehicle performed by wireless communication, and
      when acquiring, from the entry/exit management device, a second signal indicating the user's leaving the facility, output to the vehicle a fourth signal for setting the smart key function of the vehicle and permit unlocking of the door of the vehicle performed by wireless communication after a predetermined time that is set according to a distance from the facility to a parking place of the vehicle.

11. The vehicle control device according to claim 10, wherein the processor is configured to:
    when acquiring the first signal, output to the vehicle a fifth signal for setting an immobilizer function of the vehicle, in addition to the third signal and prohibit an engine of the vehicle from starting; and
    when acquiring the second signal, output to the vehicle a sixth signal for deactivating the immobilizer function of the vehicle, in addition to the fourth signal and permit the engine of the vehicle to start.

12. The vehicle control device according to claim 11, wherein the processor is configured to, when acquiring the second signal, output the fifth signal to the vehicle, after the predetermined time.

13. The vehicle control device according to claim 11, wherein the processor is configured to, when outputting the fifth signal and the sixth signal to the vehicle, output a signal indicating a setting status of the immobilizer function to a key device of the user to display the setting status of the immobilizer function on a display unit of the key device.

14. The vehicle control device according to claim 10, wherein the processor is configured to, when outputting the third signal and the fourth signal to the vehicle, output a signal indicating a setting status of the smart key function to a key device of the user to display the setting status of the smart key function on a display unit of the key device.

15. The vehicle control device according to claim 10, wherein the predetermined time is set based on an average movement time for the user to move the distance from the facility to a parking place of the vehicle.

16. A non-transitory computer-readable recording medium on which an executable program is recorded, the program causing a processor of a computer to execute:

outputting to a vehicle a third signal for deactivating a smart key function of the vehicle to prohibit unlocking of a door of the vehicle performed by wireless communication, when acquiring, from an entry/exit management device that detects that a user of the vehicle enters or leaves a facility, a first signal indicating the user's entering the facility; and outputting to the vehicle a fourth signal for setting the smart key function of the vehicle to permit unlocking of the door of the vehicle performed by wireless communication, when acquiring, from the entry/exit management device, a second signal indicating the user's leaving the facility after a predetermined time that is set according to a distance from the facility to a parking place of the vehicle.

17. The non-transitory computer-readable recording medium according to claim 16, wherein the program causes the processor to execute:

outputting to the vehicle a fifth signal for setting an immobilizer function of the vehicle, in addition to the third signal to prohibit an engine of the vehicle from starting, when acquiring the first signal; and outputting to the vehicle a sixth signal for deactivating the immobilizer function of the vehicle, in addition to the fourth signal, to permit the engine of the vehicle to start, when acquiring the second signal.

18. The non-transitory computer-readable recording medium according to claim 17, wherein the program causes the processor to execute outputting the fifth signal to the vehicle after the predetermined time, when acquiring the second signal.

19. The non-transitory computer-readable recording medium according to claim 17, wherein the program causes the processor to execute outputting signals indicating a setting status of the smart key function and a setting status of the immobilizer function to a key device of the user to display the setting status of the smart key function and the setting status of the immobilizer function on a display unit of the key device, when outputting the third signal, the fourth signal, the fifth signal, and the sixth signal to the vehicle.

20. The non-transitory computer-readable recording medium according to claim 16, wherein the predetermined time is set based on an average movement time for the user to move the distance from the facility to a parking place of the vehicle.

\* \* \* \* \*